June 14, 1938.  D. HOWARTH  2,120,467
REEL MOUNTING FOR FISHING RODS
Filed Dec. 15, 1936  2 Sheets-Sheet 2

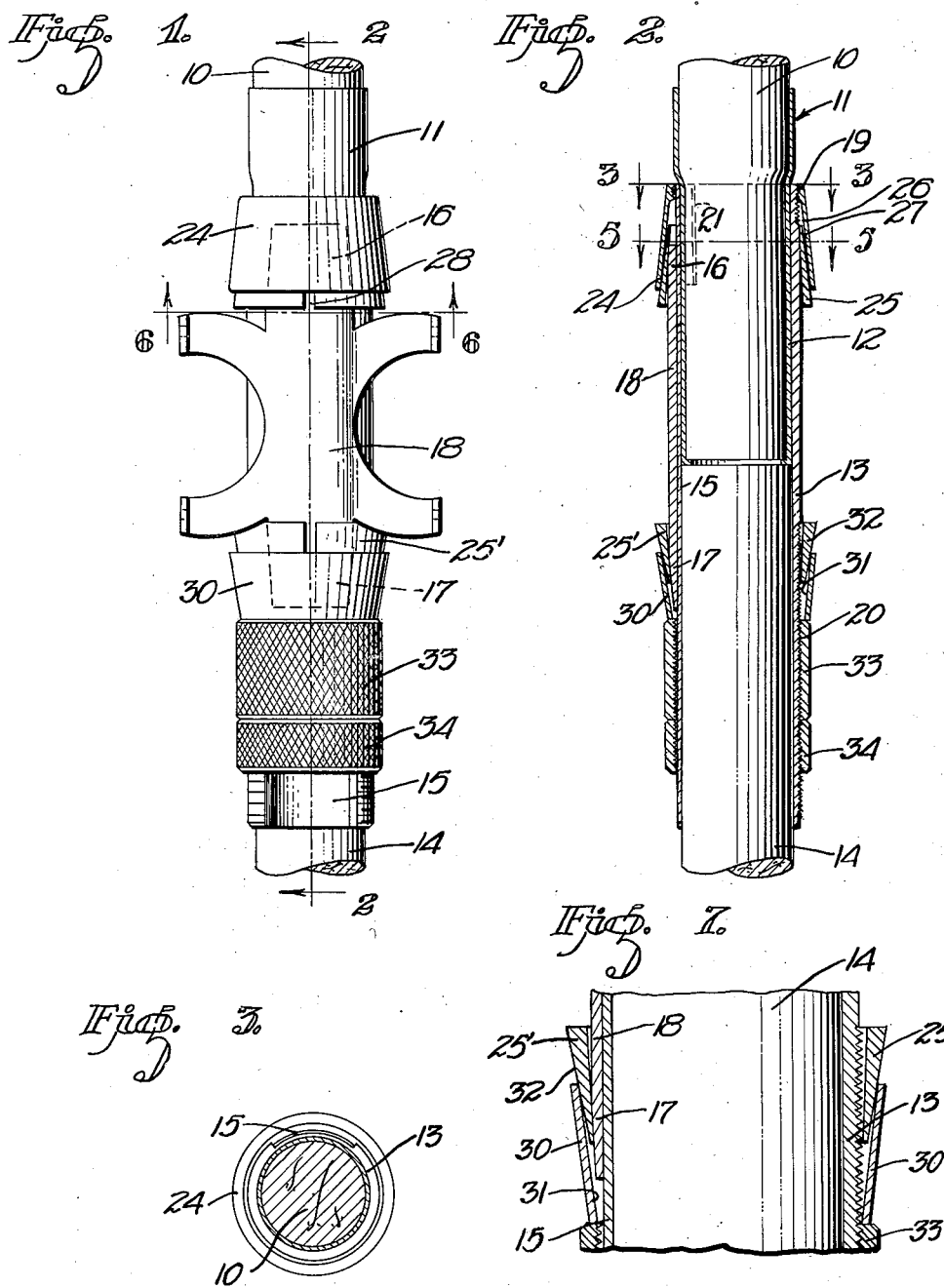

INVENTOR.
DAVID HOWARTh
BY James M. Abbott
ATTORNEYS.

Patented June 14, 1938

2,120,467

UNITED STATES PATENT OFFICE 2,120,467

REEL MOUNTING FOR FISHING RODS

David Howarth, Los Angeles, Calif., assignor to South Bend Bait Company, South Bend, Ind., a corporation of Indiana Application December 15, 1936, Serial No. 115,962

17 Claims. (Cl. 43—22)

This invention relates to fishing tackle and the like, and particularly pertains to a reel mounting for fishing rods.

It is common practice to provide means whereby a line reel may be detachably mounted upon a fishing rod. Heretofore such structures have for the most part permitted the reel or its saddle to be conveniently mounted upon the rod, but in many instances the parts would become wedged and jammed together, or corroded by the action of water so that the structure could not be disassembled save with considerable difficulty. It is the principal object of the present invention to overcome these objections by providing a reel mounting for fishing rods which will act to simultaneously hold the rod ferrule in a gripped position as well as firmly hold the reel or its saddle, and which structure is of such a mechanical structure as to insure that the structure may be easily and quickly dismantled without damage to any of the parts, and without jamming the parts together.

The present invention contemplates the provision of a reel seat adapted to receive a reel or reel anchor, and to be assembled with a handle butt and rod tip, the structure embodying means acting to secure and release all of said parts from an assembled position readily and conveniently.

The invention is illustrated by way of example in the accompanying drawings, in which:

Figure 1 is a view in elevation showing the reel seat assembled with the reel anchor, rod tip, and butt, and further illustrates the clamping means.

Fig. 2 is a view in central longitudinal section through the structure of the invention as seen on the line 2—2 of Fig. 1.

Fig. 3 is a view in transverse section through the structure as seen on the line 3—3 of Fig. 2 and discloses operation of the ferrule clamping tang.

Fig. 7 is an enlarged fragmentary view showing the adjustable locking means.

Figure 4:
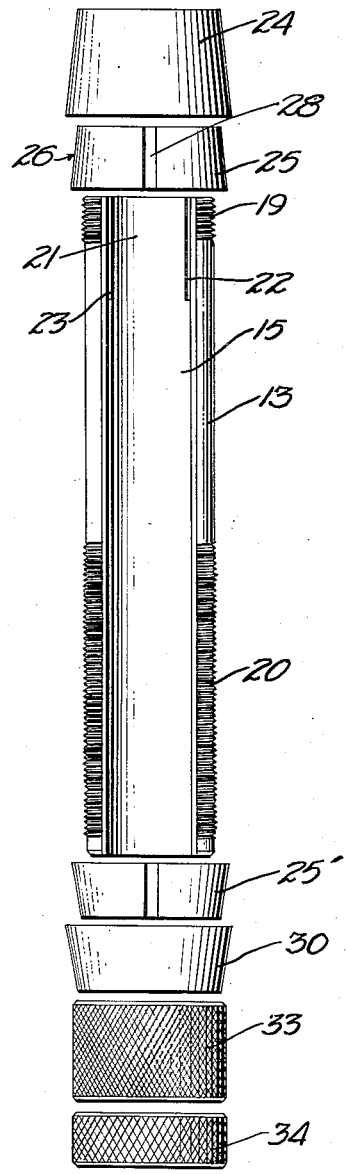
Fig. 4 is a view in elevation showing the parts of the present invention disassembled but longitudinally aligned.
Figure 5:
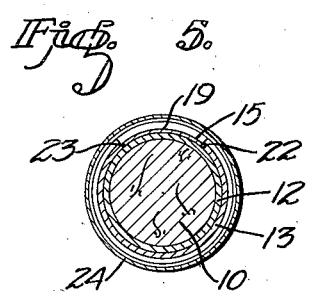
Fig. 5 is a view in transverse section as seen on the line 5—5 of Fig. 2.

Referring more particularly to the drawings, 10 indicates a fishing rod tip here shown as mounted within a tubular metal ferrule 11. The ferrule 11 has a reduced body portion 12 which extends into one end of a tubular reel seat 13. Extending into the opposite end of the tubular seat 13 is a handle butt 14. The butt 14 is permanently and securely fastened into the tubular seat 13 by any suitable method. The tip and ferrule 11 are detachably secured within the member 13 in a manner to be hereinafter set forth.

Figure 6:
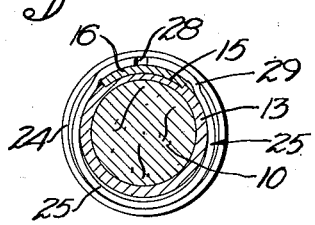
Fig. 6 is a view in transverse section as seen on the line 6—6 of Fig. 1.

The tubular reel seat 13 is here shown as being of uniform inside diameter throughout and to be of uniform wall thickness throughout save for a longitudinally extending groove of arcuate cross section forming a seat 15. As shown in Fig. 1 of the drawings this seat receives tangs 16 and 17 of a reel saddle 18. As shown in Fig. 6 of the drawings these tangs are arcuate to conform to the seat groove 15. End lengths of the tubular seat 13 are exteriorly threaded at 19 and 20, the thread portion 20 being of greater length for a purpose to be hereinafter explained. The end of the member 13 carrying the thread portion 19 is formed with a longitudinally extending lock tang 21. This is formed by slits 22 and 23 shown in Fig. 4 as cutting through the wall of member 13 at points of alignment with the opposite edges of the seat groove 15 so that the end portion of the floor of this groove may be flexed inwardly as the tang 21 locks the ferrule 12 in place.

Threaded onto the thread portion 19 of the tubular seat 13 is a lock cap 24. This cap is frusto-conical, its upper reduced end being threaded. The outwardly flaring portion forms a skirt of uniform wall thickness and into which a split lock ring 25 extends. This ring as shown in Fig. 4 is cylindrical and has a tapered face 26. The tapered face 26 is of greater inclination than tapered face 27 formed within the cap 24. Since the faces 26 and 27 contact at some point in their length it will be evident that this will be a relatively small area of contact around the diameter of the lock ring 25, thus preventing excessive binding and jamming. The ring 25 is split at 28 which permits freedom of adjustment. As shown in Fig. 6 of the drawings the wall of the ring 25 is deformed to accommodate the tang 16.

The tang 17 of the saddle 18 is held by a lock ring 25' similar in construction and function described for ring 25. The lock ring 25' is seated within a frusto-conical sleeve element 30. The inner face 31 of this sleeve is on a flatter angle than the outer tapered face 32 of the ring 25'. This will prevent jamming of the parts. The lower reduced end of sleeve 30 abuts against a nut 33 which is threaded onto the portion 20 of the tubular seat 13. The nut 33 is held in place by a lock nut 34 which is also threaded onto the portion 20.

In operation the tubular seat 13 is securely mounted on the end of the handle butt 14. A desired tip 10 and a desired reel or reel saddle 18 may then be selected. It is one of the advantages of the present invention that various sizes of reel saddles and rods may be easily assembled with the structure. The cap 24 is threaded onto end 19 of the tubular member 13. The ferrule 12 of the selected rod 10 may be inserted into the upper end of the member 13. The lock ring 25 is then placed in position within the skirt of the cap 24 after which tang 16 of the reel saddle 18 may be seated within the seat groove 15 and within the portion 29 of the ring 25. The tang 17 of the reel or reel saddle is positioned within the seat groove 15 after which the lock ring 25' is placed over the tang 17. The sleeve 30 is then placed in position as shown in Fig. 2. The nuts 33 and 34 may then be forced into position against the sleeve 30. This in turn will force all of the parts upwardly to wedge the rings 25 and 25' within the members 27 and 30 and securely grip the tangs 16 and 17. Attention is directed to the fact that when a binding action is exerted against the tang 16 of the reel saddle inward pressure will be exerted against the lock tang 21 causing it to grip and hold the ferrule. When it is desired to disassemble the structure the pressure of the nuts 33 and 34 may be relieved. This will permit the reel to be easily removed and will at the same time relieve the gripping action upon the rod 10 and its ferrule 11, permitting it to be easily withdrawn from the tubular member.

It will thus be seen that the structure here disclosed provides simple and effective means for holding a handle, reel and rod in an assembled position while providing means whereby the parts may be released readily and disassembled.

While I have shown the preferred form of my invention, as now known to me, it will be understood that various changes might be made in the combination, construction, and arrangement of parts, by those skilled in the art, without departing from the spirit of the invention as claimed.

Having thus described my invention, what I claim and desire to secure by Letters Patent is:

1. A reel mounting for fishing rods comprising a tubular reel seat, a handle carried at one end thereof, a rod carried at the opposite end thereof, a longitudinally extending seat groove formed on the tubular reel seat to receive the tangs of a reel saddle, separate frusto-conical members on said tubular reel seat and embracing said saddle tangs, wedge means interposed between said tangs and frusto-conical members to produce a binding action, and means carried upon the tubular seat for clamping the structure, the meeting faces of said conical members and the wedge means being at different angles.

2. A reel mounting for fishing rods comprising a tubular reel seat, a handle carried at one end thereof, a longitudinally extending seat groove formed on the tubular reel seat to receive the tangs of a reel saddle, separate frusto-conical members on said tubular reel seat and embracing said saddle tangs, wedge means interposed between said tangs and frusto-conical members to produce a binding action, means carried upon the tubular seat for clamping the structure, the meeting faces of said conical members and the wedge means being at different angles, a rod to be detachably mounted within said tubular reel seat, said frusto-conical members compressing said wedge means for clamping said rod within said tubular member.

3. A reel mounting for fishing rods comprising a tubular reel seat, a handle carried at one end thereof, a longitudinally extending seat groove formed on the tubular reel seat to receive the tangs of a reel saddle, separate frusto-conical members on said tubular reel seat and embracing said saddle tangs, wedge means interposed between said tangs and frusto-conical members to produce a binding action, means carried upon the tubular seat for clamping the structure, the meeting faces of said conical members and the wedge means being at different angles, a rod to be detachably mounted within said tubular reel seat, said reel seat including a resilient portion forced inwardly against the rod by the reel clamping means.

4. A reel mounting for fishing rods, comprising a cylindrical reel seat formed with a longitudinal seat groove having slits at one end thereof, said groove being adapted to receive the tangs of a reel saddle, a frusto-conical member fixed at one end thereof, and adapted to receive a wedge member, the opposite end of the reel mounting carrying a slidably mounted frusto-conical member which is adapted to receive a wedge member, said last named end of said reel mounting carrying a nut adapted to act against the slidable frusto-conical member to lock the reel saddle within the reel mounting.

5. A reel mounting for fishing rods, comprising a cylindrical reel seat formed with a longitudinal seat groove having slits at one end thereof, forming a rod lock tang, said groove being adapted to receive tangs of a reel saddle, a frusto-conical member fixed at one end thereof, and adapted to receive a wedge member, the opposite end of the reel mounting carrying a slidably mounted frusto-conical member which is adapted to receive a wedge member, said last named end of reel mounting carrying a nut adapted to act against the slidable frusto-conical member to lock the reel saddle and rod within the reel mounting.

6. In a reel mounting for fishing rods, a cylindrical member upon which the base plate of a reel seats, a tapered ring encircling said member, and an annular member of wedge section received in said ring and overlying said base plate, said ring and wedge extending at different angles to facilitate separation thereof.

7. In a reel mounting for fishing rods, an elongated member against which the base plate of a reel is adapted to seat, a tapered retainer encircling a portion of said member, and a split adapter of wedge section fitting within said retainer to overlie an end of said base plate, said adapter conforming to said base plate and retainer to effect substantially equal circumferential gripping action therewith upon longitudinal pressure thereagainst by said retainer.

8. In a reel mounting for fishing rods, an elongated member against which the base plate of a reel is adapted to seat, a tapered retainer ring encircling a portion of said member, and a split adapter ring of wedge section encircling said member and fitting in said retainer, said adapter having an interior off-set to receive said base plate formed in adjacent end portions whereby pressure exerted by said retainer longitudinally of said member applies equal radial pressure on said adapter throughout its circumference and brings the end walls of said off-set into engagement with the sides of said base plate.

9. In a reel mounting for fishing rods, an elongated member against which a base plate of a reel is adapted to seat, a tapered retainer ring encircling said member, and an adapter ring fitting in said retainer and having an interior off-set, said ring being split intermediate said off-set whereby axially directed stress exerted on said adapter by said retainer compresses said adapter to grip said member and engage the sides of said base plate.

10. A reel mounting for fishing rods comprising a cylindrical reel seat having spaced slits therein to define a resilient portion thereof, a reel saddle mounted thereon at said resilient portion, means at opposite ends of said reel seat to exert longitudinal gripping pressure upon said saddle, and means interposed between said pressure means for creating a radial wedging force for depressing said resilient portion and gripping said saddle.

11. In combination, a rod, a cylindrical reel seat mounted on said rod and having spaced slits therein to define a resilient portion, a reel saddle mounted on said seat at said resilient portion, means at opposite ends of said seat to exert longitudinal gripping pressure on said saddle, and means between said last named means for creating a radial wedging pressure on said saddle whereby said saddle presses said resilient portion radially against said rod.

12. In combination, a rod, a hollow reel seat fitting on said rod and having spaced elongated cuts defining a resilient portion therein, a reel having a base plate seating on said resilient portion, means exerting pressure longitudinally of said plate, and means actuated by said last named means for creating a radial gripping action on said plate and reel seat whereby said plate presses said resilient portion against said rod.

13. In combination, a rod, a hollow reel seat fitting on said rod and having spaced elongated cuts to define a resilient portion therein, a reel having a plate seating on said resilient portion, and means for exerting a radial gripping action on said plate and reel seat whereby said plate presses said resilient portion against said rod.

14. In combination, a hollow elongated reel seat having a pair of elongated slits therein spaced to define a resilient reel supporting portion and a substantially rigid portion of major circumferential dimension adjacent said slits, a reel saddle seating on said resilient portion, and saddle locking means creating a radial wedging action on said reel seat and saddle to press said saddle inwardly on said resilient portion and thereby shift said resilient portion.

15. A reel mounting for fishing rods comprising a cylindrical reel seat formed with a longitudinal seat groove for receiving the tangs of a reel saddle or the like, said longitudinal seat groove having slits at one end thereof to form a flexible rod lock tang, means at the opposite ends of said reel seat to exert longitudinal gripping pressure upon said reel saddle tangs, and means interposed between said gripping means and said saddle tangs to create a radial wedging force between said gripping means and reel saddle tangs and upon said reel seat.

16. A reel mounting for fishing rods comprising a cylindrical reel seat formed with a longitudinal seat groove for receiving the tangs of a reel saddle or the like, said longitudinal seat groove having slits at one end thereof to form a flexible rod lock tang, means at opposite ends of said reel seat to exert a longitudinal gripping pressure upon said reel saddle tangs, means interposed between said gripping means and said saddle tangs to create a radial wedging force between said gripping means and reel saddle, and a rod carried by said reel seat, said rod lock tang being flexed responsive to said wedging force to grip and hold said rod.

17. A reel mounting for fishing rods comprising a tubular reel seat, a handle carried at one end thereof, a rod carried at the opposite end thereof, a longitudinally extending seat groove formed on the tubular reel seat to receive the tangs of a reel saddle, said longitudinal seat groove having slits at one end thereof to form a flexible rod lock tang, separate frusto-conical members on said tubular reel seat and embracing said saddle tangs, wedge means interposed between said tangs and conical members to produce a binding action upon said saddle tangs and said rod lock tang, and means carried upon the tubular seat for clamping the structure.

DAVID HOWARTH.